(12) United States Patent
Lottes et al.

(10) Patent No.: US 12,017,534 B2
(45) Date of Patent: Jun. 25, 2024

(54) DISPLAY DEVICE FOR A MOTOR VEHICLE, METHOD FOR GENERATING A VIRTUAL DISPLAY OF OPTICAL IMAGE INFORMATION, AND MOTOR VEHICLE

(71) Applicant: AUDI AG, Ingolstadt (DE)

(72) Inventors: Daniel Lottes, Ihrlerstein (DE); Philipp Weiß, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 686 days.

(21) Appl. No.: 17/259,797

(22) PCT Filed: May 10, 2019

(86) PCT No.: PCT/EP2019/062085
§ 371 (c)(1),
(2) Date: Jan. 12, 2021

(87) PCT Pub. No.: WO2020/011418
PCT Pub. Date: Jan. 16, 2020

(65) Prior Publication Data
US 2021/0221227 A1    Jul. 22, 2021

(30) Foreign Application Priority Data

Jul. 13, 2018  (DE) ..................... 10 2018 211 747.0

(51) Int. Cl.
*B60K 35/60*  (2024.01)
*B60K 35/23*  (2024.01)

(52) U.S. Cl.
CPC ............. *B60K 35/60* (2024.01); *B60K 35/23* (2024.01); *B60K 2360/23* (2024.01); *B60K 2360/332* (2024.01); *B60K 2360/338* (2024.01)

(58) Field of Classification Search
CPC ........... B60K 37/02; B60K 2370/1529; B60K 2370/23; B60K 2370/332;
(Continued)

(56) References Cited

U.S. PATENT DOCUMENTS 5,103,325 A * 4/1992 Andrews ................ C12N 11/02
349/193
5,810,465 A * 9/1998 Hargabus ............. G02B 27/144
362/135
(Continued)

FOREIGN PATENT DOCUMENTS

CN          105204172 A    12/2015
DE   10 2008 037 060 A1    2/2010
(Continued)

OTHER PUBLICATIONS

Translation by WIPO dated Jan. 14, 2021 of International Preliminary Report on Patentability from International Application No. PCT/EP2019/062085, 5 pages.
(Continued)

*Primary Examiner* — Timothy R Newlin
(74) *Attorney, Agent, or Firm* — STAAS & HALSEY LLP (57) ABSTRACT

At least one electronic display has first and second mirrors separated by a distance. The two mirrors are arranged such that they at least partially overlap in a projection view of both mirrors. An intermediate space is formed in the overlap region between the mirrors. The at least one electronic display is part of a display apparatus having at least one light source emitting light into the intermediate space that is reflectable multiple times by the mirrors to generate an infinity mirror effect, resulting in the generation of an image having a light pattern that appears with an optical depth effect in an image plane of the display apparatus.

20 Claims, 4 Drawing Sheets

(58) Field of Classification Search
CPC .............. B60K 2370/338; G02B 30/35; G02B 2027/0127; G02B 2027/0134; G02B 27/0101; H04N 13/395
See application file for complete search history.

(56) References Cited

U.S. PATENT DOCUMENTS

| | | | |
|---|---|---|---|
| 7,029,152 B1 | 4/2006 | Kuhl | |
| 10,310,274 B1* | 6/2019 | Reichow | G02B 27/026 |
| 2004/0135741 A1* | 7/2004 | Tomisawa | H04N 13/398 |
| | | | 348/E13.059 |
| 2006/0284788 A1* | 12/2006 | Robinson | G09F 19/12 |
| | | | 345/3.1 |
| 2011/0157667 A1* | 6/2011 | Lacoste | G03H 1/0808 |
| | | | 359/9 |
| 2011/0242670 A1* | 10/2011 | Simmonds | G02B 5/0833 |
| | | | 385/37 |
| 2015/0153569 A1 | 6/2015 | Yonekubo | |
| 2015/0268467 A1 | 9/2015 | Cakmakci et al. | |
| 2017/0206815 A1* | 7/2017 | Whitmire | G09F 13/04 |
| 2017/0315358 A1 | 11/2017 | Masuda | |
| 2017/0371155 A1 | 12/2017 | Kamiya | |
| 2018/0275350 A1* | 9/2018 | Oh | G02B 27/0172 |
| 2018/0348533 A1* | 12/2018 | Li | H04N 13/388 |
| 2018/0350236 A1* | 12/2018 | Yamaguchi | G08G 1/0962 |
| 2019/0155033 A1* | 5/2019 | Gelman | G02B 27/0093 |
| 2019/0235243 A1* | 8/2019 | Anzai | G02B 5/3025 |
| 2019/0235252 A1* | 8/2019 | Freedman | G02B 26/121 |
| 2019/0293853 A1* | 9/2019 | Ayres | G02B 5/1819 |
| 2022/0011573 A1* | 1/2022 | Ahn | G02B 27/0101 |
| 2022/0373160 A1* | 11/2022 | Stephens | H05B 47/115 |

FOREIGN PATENT DOCUMENTS

| | | |
|---|---|---|
| DE | 10 2014 016 324 A1 | 5/2016 |
| DE | 10 2014 019 122 A1 | 6/2016 |
| DE | 10 2016 220 539 A1 | 4/2017 |
| DE | 10 2018 211 747.7 | 7/2018 |
| DE | 10 2017 203 173 A1 | 8/2018 |
| EP | PCT/EP2019/062085 | 5/2019 |
| JP | H06-34689 U | 5/1994 |
| JP | 2006-135378 A | 5/2006 |
| JP | 2008-20564 A | 1/2008 |
| JP | 2012-88739 A | 5/2012 |
| WO | PCT/EP2019/062085 | 5/2019 |

OTHER PUBLICATIONS

Chinese Office Action dated Feb. 10, 2022 for Chinese Application No. 201980046861.4.
International Search Report dated Aug. 16, 2019 from International Application No. PCT/EP2019/062085, 4 pages.
German Office Action dated Feb. 21, 2019 from German Application No. 10 2018 211 747.0, 10 pages.

* cited by examiner

DISPLAY DEVICE FOR A MOTOR VEHICLE, METHOD FOR GENERATING A VIRTUAL DISPLAY OF OPTICAL IMAGE INFORMATION, AND MOTOR VEHICLE

CROSS REFERENCE TO RELATED APPLICATIONS

This application is a U.S. national stage of International Application No. PCT/EP2019/062085, filed on May 10, 2019. The International Application claims the priority benefit of German Application No. 10 2018 211 747.0 filed on Jul. 13, 2018. Both the International Application and the German Application are incorporated by reference herein in their entirety.

DESCRIPTION

Described below is a display apparatus for a motor vehicle, having at least one electronic display, having a first mirror and, arranged at a distance therefrom, a second mirror, wherein the two mirrors are arranged such that they are arranged so as to at least partially overlap in the case of a projection view of both mirrors, and an intermediate space is formed in the overlap region between the mirrors. Also described are a motor vehicle having a display apparatus, wherein visual information is representable in a virtual image plane using the display apparatus, and a method for generating a virtual representation of visual information in a virtual image plane using a corresponding display apparatus.

DE 10 2014 019 122 A1 describes a method for operating a display system of a motor vehicle, in which a first object and a second object are displayed in two virtual image planes that are arranged one behind the other by means of a display device with the aid of a mirror arrangement for as long as the captured eye position corresponds to a specified eye position. The display device is controlled such that a relative arrangement of the objects with respect to one another is set such that the objects are displayed in the form of a graphic that is contiguous so as to be flush with respect to a specified line of sight over the virtual image planes. As soon as a deviation between the captured eye position and the specified eye position is captured, parallax correction is performed by means of the control device.

DE 10 2014 016 324 A1 describes a display system for a motor vehicle, with at least one display device having at least two display regions, and with a mirror arrangement having at least one partially transparent mirror and a further mirror. The display device and the mirror arrangement are arranged relative to one another such that respective objects displayed by means of the two display regions are displayed in two virtual image planes arranged one behind the other. The display device is arranged, in its correct arrangement of the display system in the motor vehicle, in the vertical vehicle direction above the mirror arrangement. Also mentioned is a method for operating a display system and a motor vehicle having at least one display system.

One disadvantage of the prior art is that the image representation is limited.

SUMMARY

The display apparatus and method described herein generate an image representation in which the image representation is more versatile and improved with respect to a spatial perception, compared to the prior art . . .

One aspect of relates to a display apparatus for a motor vehicle, having at least one electronic display, having a first mirror and, arranged at a distance therefrom, a second mirror. The two mirrors are arranged such that they are arranged so as to overlap at least partially in a projection view of both mirrors, and an intermediate space is formed in the overlap region between the mirrors. The display apparatus has at least one light source that is arranged such that the light thereof is emittable into the intermediate space and is reflectable there multiple times at the mirrors to generate an infinity mirror effect, resulting in the generation of an image having a light pattern that appears with an optical depth effect, in an image plane of the display apparatus. An image representation is improved thereby, in particular with respect to the spatial representation of visual information. It is thereby also possible to represent visual information in a more diverse manner. A greater variability for the image representation is thus attained. In particular, it is thus also possible to allow a display that is closer to reality with respect to the spatial representation. The projection view is effected in particular perpendicularly to the mirrors so that a projection plane lies in particular parallel to the mirrors.

In particular, a holographically acting image can be generated with the arrangement of the components of the display device.

The two mirrors may be arranged such that a defined distance between the two mirrors is always maintained. The first mirror can be arranged for example parallel to the second mirror. In particular, the two mirrors can partially overlap and thus form the intermediate space. The width of the intermediate space can correspond in particular to the defined distance between the first mirror and the second mirror. Viewed perpendicularly to the mirrors, the intermediate space is thus delimited by the two mirror faces, and when viewed parallel to the mirrors, delimited by the surface dimensions of the mirrors. The intermediate space thus does not extend beyond the dimensions of the mirrors.

In particular, the two mirrors are arranged parallel to each other. They can have the same surface area or indeed have different surface areas. Provision may also be made that the two mirrors are arranged so that they are congruent in the projection view.

The one single image plane is formed in particular in the region of the mirrors. The image plane is formed in particular between the mirror and thus in the intermediate space.

The light source can be arranged for example such that the light from the light source can be emitted or radiated into the intermediate space between the two mirrors. In this case, in particular a light beam of the light is reflected multiple times or infinitely from the first mirror to the second mirror and vice versa. Owing in particular to the multiple reflection of the light beam, the light pattern appearing with optical depth effect is generated in the single image plane of the display apparatus. In this way, for example the image that can be represented in the image plane can be represented to a viewer, in combination with the light pattern, to be holographic or floating. This achieves in particular three-dimensional perception of the image.

In an advantageous embodiment, provision is made that a light source is a component that is separate from the display, in particular is a light-emitting diode or a light-emitting diode strip. The light source can therefore be a unit external to the display and be arranged independently from the electronic display. For example, the light source can be embodied in the form of a light-emitting diode strip to also allow a linear emission of the light. In particular, the strip can have a length that substantially or exactly corresponds to the length of the intermediate space. In this way, light can be radiated into the intermediate space as uniformly as possible over the entire length of the intermediate space. Likewise, the display apparatus can have, for example, a plurality of separate light sources that can be embodied in the form of individual light-emitting diodes.

Provision may be made that the light source is arranged at least partially in the intermediate space delimited by the mirrors. To permit multiple reflections in particular of the light beam of the light source at the first and second mirrors with a short distance, the light source may be arranged in the intermediate space of the two mirrors. The light source can here be mounted for example at one end of the intermediate space. Likewise, the light source can be mounted such that in particular a distance between the light source and the two mirrors is the same or that the light source is mounted either closer to the first mirror or closer to the second mirror. Since the at least one light source is arranged so as to at least partially protrude into the intermediate space, the entire construction can be designed to be compact and, moreover, emission losses of the light that do not reach the intermediate space are minimized.

In a further embodiment, provision is made that a light source is formed by a partial region of the electronic display itself, wherein the partial region is arranged in particular to adjoin peripheral sides of the mirrors. The partial region is arranged in particular such that it extends at least partially over the extent of the intermediate space measured between the mirrors. It is thus also possible that no additional component is used as the light source but that a partial region of the electronic display is used as the light source. The electronic display can be arranged for example such that the partial region that is integrated into the display and thus formed in one piece is arranged at the respective peripheral sides of the first and second mirrors. In particular, the partial region can extend here along an imaginary connecting line drawn between the mirrors.

For example, the partial region can be provided with a special film so as to be able to emit the light beams in a better way and thus in particular a better directed way. It is thus advantageously possible to dispense with mounting of additional light sources.

Provision may be made that the partial region lies directly at the peripheral sides of the two mirrors and delimits the intermediate space. The partial region of the electronic display can in particular terminate flush with the peripheral sides of the mirrors and thus delimit or close off the intermediate space. In this way, the light of the partial region can be radiated into the intermediate space with particularly low losses and with a short distance and be reflected multiple times by the two mirrors. This results in a particularly advantageous infinity mirror effect because it is also possible to generate a holographic image that is very bright and has sharp contours.

In one conceivable refinement, provision is made that one of the two mirrors, in particular the first mirror facing the display, is at least partially embodied to be semi-transparent. For performing the infinity mirror effect, in particular the light from the light source is thus reflected at the two mirrors on the other hand, the image plane can be viewed through the first mirror. To ensure for example that all the light beams are reflected at the first mirror and are not deflected in the direction of the viewer, the first mirror is embodied for example as a semi-transparent mirror. In this way, in particular light beams from, for example, the electronic display can pass through it. In particular, no light beams from the light source that were emitted into the intermediate space can be radiated out of the intermediate space through the mirror.

Provision may be made that an angle between the electronic display and the first mirror is greater than 0° and smaller than 90°, in particular greater than or equal to 45° and smaller than 90°, in particular between greater than or equal to 70° and smaller than 90°. In particular, the value of the angle can be defined in the interval between 0° and 90°, with the result that the visual image information can be mirrored into the first mirror in an optimum manner. For example, the angle can be selected such that the viewer always looks into the virtual image plane above the electronic display. The electronic display can thus be oriented such that it is inclined with respect to the first mirror such that in particular an extensive emission of the image information of the display onto the first mirror can take place, but without the view of the first mirror being restricted.

In a further advantageous embodiment, provision is made that visual image information generated by the display is mirrored into the image plane via the first mirror so that the visual image information in the image generated in the image plane is represented in addition to the light pattern. Light patterns generated by in particular the multiple reflection of the light beam of the light source at the two mirrors, an optical depth effect can be generated for the viewer. The light pattern can here for example lie in the image plane. The electronic display can generate the visual image information that can contain for example music titles, route information, vehicle data, entertainment notifications, etc. These are only examples of visual image information and should certainly not be understood to be exhaustive. In principle, a wide variety of visual image information can be displayed. This visual image information can be projected in particular by the first mirror into the same image plane into which the light pattern is also projected.

The image, in particular holographic image, represented in the image plane is therefore in particular an overlay of the visual image information and the light pattern. The light pattern can in particular have an infinite depth effect, with the result that the projected visual image information in the image plane appears as a holographic representation. In this way, the visual image information can be perceived by the viewer as a quasi three-dimensional, floating representation.

Provision is made in an exemplary embodiment that an electronic capturing unit captures a head position and/or eye movement of a vehicle occupant of the motor vehicle and the display apparatus is adapted depending on the captured head position and/or eye movement. In this way it is possible in particular to attain a dynamic alignment of the visual image information in the image plane. By capturing the head position and/or eye movement of the vehicle occupant, the representation in the image plane can be changed such that the vehicle occupant can perceive the visual image information three-dimensionally even if the vehicle occupant is moving. In particular, an apparatus for the motor vehicle is formed by the display apparatus and the capturing unit.

In particular, the display apparatus can be equipped with a dual view system (for example what is known as dual-view technology), and in this way respectively different visual image information for a first vehicle occupant and a second vehicle occupant can be represented in a common image plane.

For example, the display apparatus can be provided with a film and thereby visual image information for a first vehicle occupant can be represented and blocked for a second vehicle occupant, or vice versa.

A further aspect relates to a motor vehicle with a display apparatus according to the abovementioned aspect or an advantageous embodiment thereof, wherein visual information is representable in a virtual image plane with the display apparatus. In this case, the display apparatus is formed for example in or on the dashboard of the vehicle. The display apparatus has in particular two mirrors and an electronic display that generates visual image information that is projected with the mirror assigned to the display into the virtual image plane.

A further aspect relates to a method for generating a virtual representation of visual information in a virtual image plane with a display apparatus, wherein image information from an electronic display of the display apparatus is reflected into the virtual image plane using a first mirror of the display apparatus. At least one light beam from a light source of the display apparatus is emitted into an intermediate space between the first mirror and a second mirror of the display apparatus that is separate and arranged at a distance from the former. The light beam is reflected multiple times between the mirrors in the intermediate space to generate an infinity mirror effect, wherein in this way an image with a (holographic) light pattern that appears with optical depth effect is generated in the, at least one, virtual image plane of the display apparatus. In particular, the virtual representation of the optical image information and the light pattern in the image are represented in the same image plane as visual information.

Advantageous embodiments of the display apparatus should be considered to be advantageous embodiments of the method, wherein the components of the display apparatus alone or at least in component combinations, in particular as concerning their configuration and/or position, in particular also relative to one another, for this purpose make possible the method for generating the image.

The visual image information can be generated for example by the electronic display and be projected into the virtual image plane with the first mirror. The image plane is produced in particular between the first mirror and the second mirror.

BRIEF DESCRIPTION OF THE DRAWINGS

These and other aspects and advantages will become more apparent and more readily appreciated from the following description of the exemplary embodiments, taken in conjunction with the accompanying drawings of which.

These and other aspects and advantages will become more apparent and more readily appreciated from the following description of the exemplary embodiments, taken in conjunction with. the accompanying figures, of which.

DETAILED DESCRIPTION

In the exemplary embodiments explained below, the described components of the embodiments each constitute individual features that should be considered independently of one another and that in each case also develop the invention independently of one another and should therefore also be considered individually or in a combination other than the one shown. The described embodiments are furthermore also able to be supplemented by the features that have already been described.

In the figures, identical or functionally identical elements have been provided with the same reference symbols.

Figure 1:
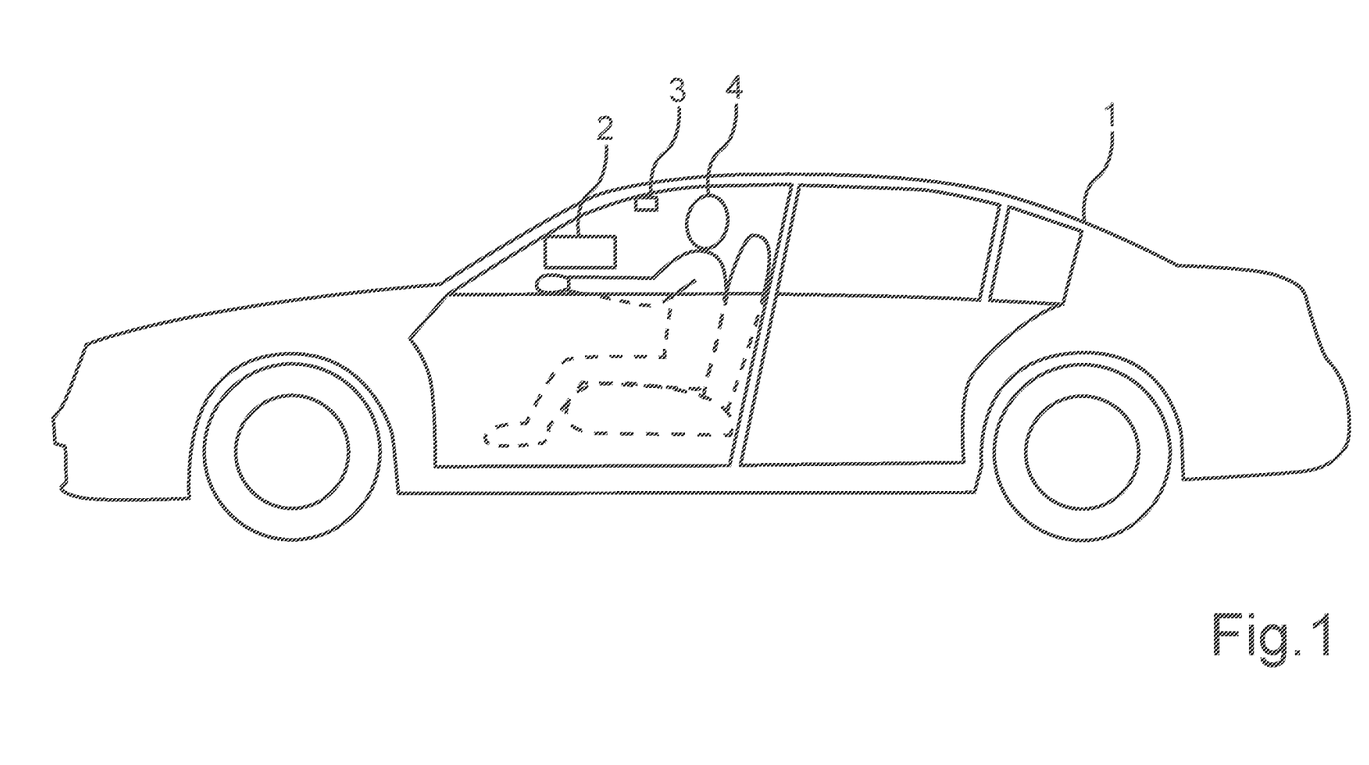
FIG. 1 is a schematic side view of an exemplary embodiment of a motor vehicle having an exemplary embodiment of a display apparatus.

Overall, FIG. 1 shows an advantageous exemplary embodiment with a motor vehicle 1 and an optical display apparatus 2 installed in the motor vehicle 1. The display apparatus 2 can generate a virtual representation of visual information in a virtual image plane 10 (cf. FIG. 3).

In particular, a head position and/or eye movement of a vehicle occupant 4 can be captured with an electronic capturing unit 3 of the motor vehicle 1. In particular, the display apparatus 2 can be adapted depending on the change in the captured head position and/or eye movement of the vehicle occupant 4. For example, adaptation of the display apparatus 2 can be effected automatically, depending on the current head position and/or eye movement. For example, the entire display apparatus 2 can be changed. In particular, the electronic display 5 can be changed by adapting the angle between the electronic display 5 and the first mirror S1.

Figure 2:
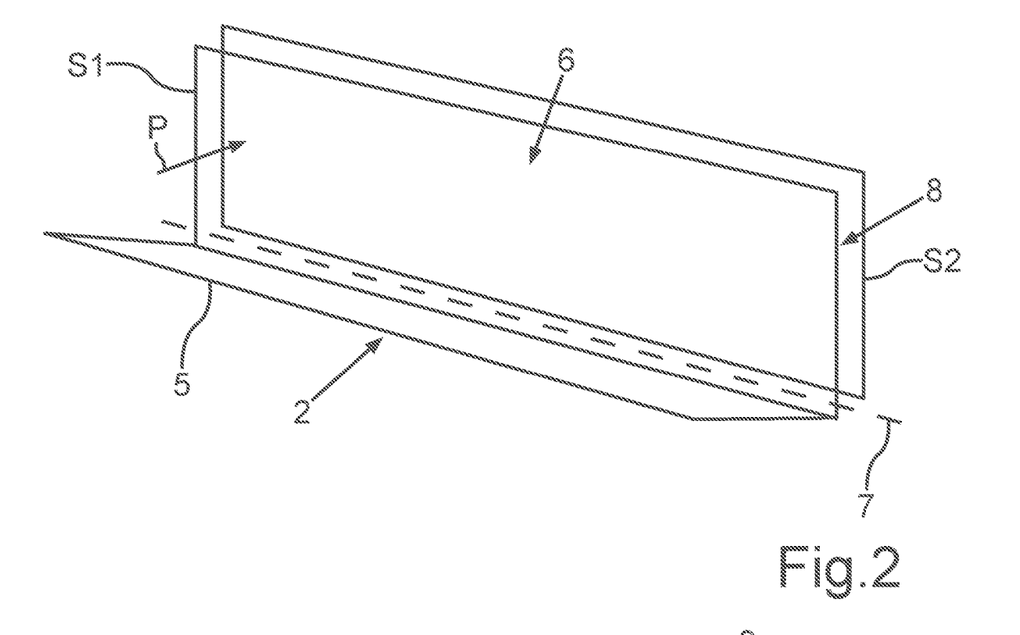
FIG. 2 is a schematic, perspective illustration of an exemplary embodiment of a display apparatus.

FIG. 2 shows an exemplary embodiment of the display apparatus 2. The display apparatus 2 has at least one electronic display 5 and a first mirror S1, and also, at a distance therefrom, a second mirror S2. In particular, the two mirrors S1, S2 are arranged such that they are arranged so as to at least partially overlap in a projection plane in the case of a projection view of both mirrors S1, S2. By way of example, the direction of the projection view is symbolized by the arrow P. In particular, a projection view is perpendicular to the planes in which the mirrors S1, S2 extend. Here, for example an overlap region 6 can define or span an intermediate space 8 (see FIG. 3) between the first mirror S1 and the second mirror S2 with respect to the surface dimensions. The two mirrors S1, S2 are arranged in particular parallel to one another. They can be of the same size and be arranged to be congruent for the projection view.

Figure 3:
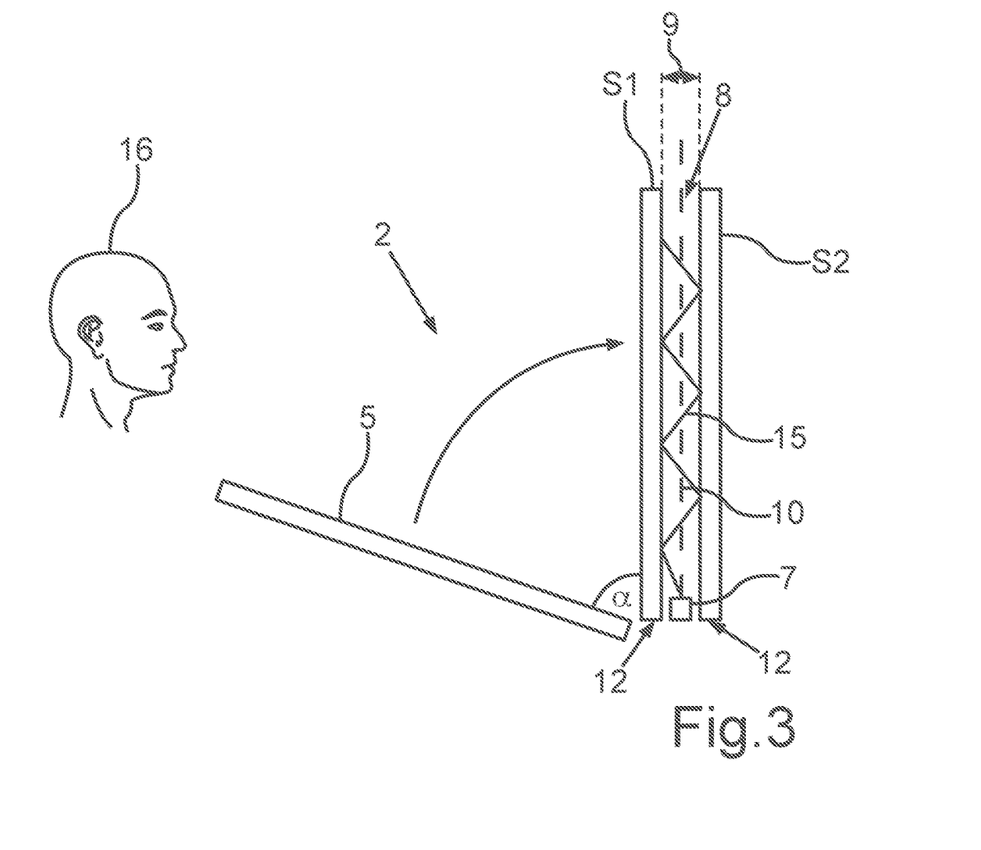
FIG. 3 is a schematic side view of the display apparatus according to FIG. 2.

The display apparatus 2 has, for example, at least one light source 7, which may be for example a light-emitting diode or a light-emitting diode strip. The light source 7 can be arranged such that the light therefrom is emitted into the intermediate range 8. A light beam 15 of the light can be reflected multiple times to-and-fro in particular at the two mirrors S1, S2, and an infinity mirror effect is created thereby. Owing to the multiple or infinite reflection of the light beam 15, in particular a light pattern 13 (cf. FIG. 6), a holographic light pattern may be generated in the image plane 10. The display apparatus 2 is embodied such that only one image plane 10 is formed. Image plane 10 is embodied in particular in the intermediate space 8 and oriented in particular parallel to the mirrors S1, S2, as is shown in FIG. 3. To design the infinity mirror effect to be more efficient, in particular the first mirror S1 can at least partially be embodied to be semi-transparent.

FIG. 3 shows a schematic side view of the display apparatus 2. Intermediate space 8 has a measured extent 9, given by the distance between the mutually facing inner sides of the mirrors S1, S2. The intermediate space 8 is delimited in the height direction by the heights of the mirrors S1, S2.

The electronic display 5 can be arranged in particular at an angle with respect to the first mirror S1. A periphery of the electronic display 5 can here lie flush against the first mirror S1, for example. In particular, an angle α between the first mirror S1 and the electronic display 5 may be specified. The angle α can here for example be greater than 0° and smaller than 90° or greater than or equal to 70° and smaller than 90°. The angle α is defined in particular in the interval 0° and 90°, so that the viewer 16 always looks into the virtual image plane 8 above the electronic display 5.

The light source 7 can be arranged in particular partially in the intermediate space 8 of the first mirror S1 and second mirror S2, as is shown in FIG. 3. The intermediate space 8 is delimited in terms of height by narrow edges or peripheral sides 12 of the mirrors S1, S2. The light source 7 can be arranged such that the distance from the mirror S1 and from the mirror S2 is the same. However, the distances from the first mirror S1 and from the second mirror S2 can differ, for example. In particular, the light source 7 can be arranged at one of the two ends (viewed in the height direction) of the intermediate space 7. In order to attain a more extensive emission into the intermediate space 8, in particular more light sources can be arranged in the intermediate space 8.

In particular, the visual image information generated by the electronic display 5 is reflected via the first mirror S1 into the image plane 10. The only image plane 10 is located in the intermediate space 8 of the first mirror S1 and the second mirror S2. Provision may likewise be made that the image plane 10 overlays with the second mirror S2 and thus the image plane is located in the plane of the second mirror S2. Owing to the light pattern that is generated by the infinity mirror effect of the multiply reflected light beams and the virtual image information 18 (FIG. 6) of the electronic display 5, an image 17 (FIG. 6) in which said two separate image parts are represented together, in particular even in overlaid fashion, is generated in the image plane 10. The image 17 is generated with a depth effect and also generated as a holographic image 17.

Figure 4:
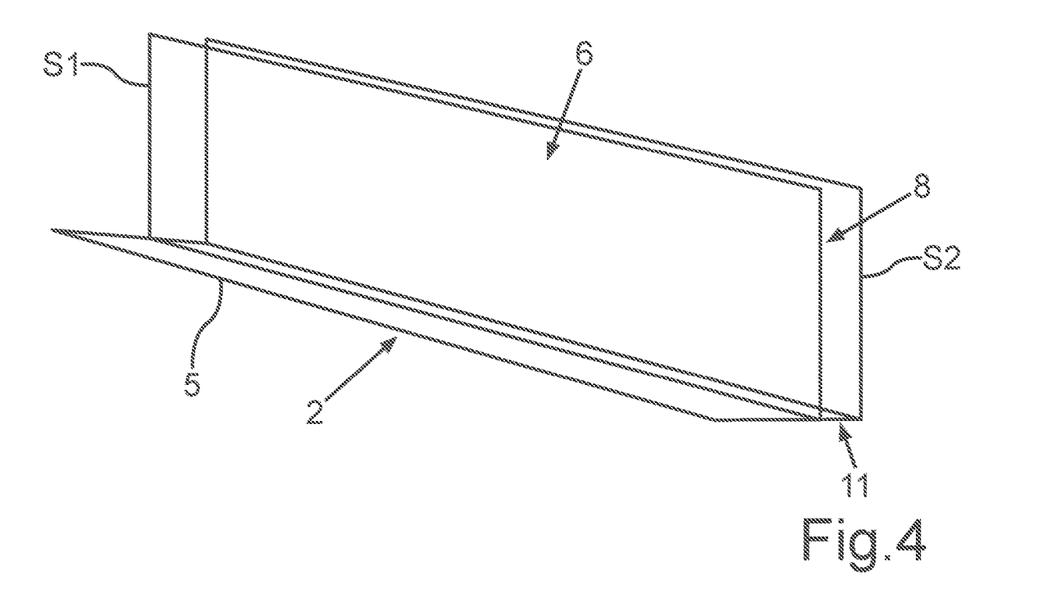
FIG. 4 is a schematic, perspective illustration of a further exemplary embodiment of a display apparatus.

FIG. 4 shows an exemplary arrangement of a further exemplary embodiment of a display apparatus 2, in which the light source is formed by a partial region 11 of the electronic display 5 itself. For example, the electronic display 5 can be formed from different display parts. The part of the electronic display 5 that is located in particular upstream of the first mirror S1 serves for generating the visual image information. In particular, the display part that extends at least partially over the intermediate space 8 of the two mirrors S1, S2 and is formed by the partial region 11 and is thus arranged so that it overlaps with the intermediate space 8 as viewed in the direction perpendicular to the mirrors S1, S2 can be used for emitting the light into the intermediate space 8. In this case, the partial region 11 can be formed for example with a special film so as to achieve a specific emission. The partial region 11 in the exemplary embodiment extends over the entire extent 9 and thus covers the intermediate space 8 in a delimiting manner (FIG. 5).

Figure 5:
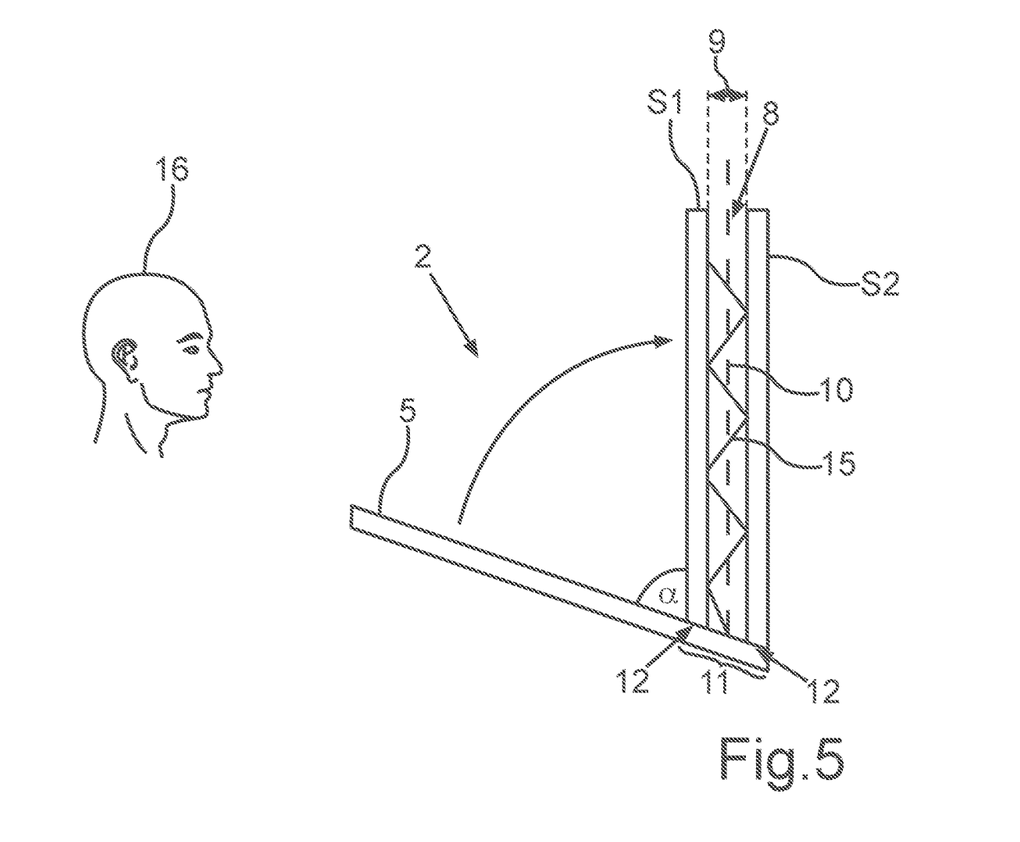
FIG. 5 is a schematic side view of the display apparatus according to FIG. 4.

FIG. 5 illustrates an exemplary side view of the display apparatus 2 with the partial region 11 of the electronic display 5 as the light source. Here, in particular the partial region 11 can be arranged at peripheral sides 12 of the two mirrors S1, S2. In particular, the partial region 11 can lie directly and flush against the peripheral sides of the two mirrors S1, S2 and thus downwardly concretely delimit the intermediate space 8. In this way, the generation of the infinity mirror effect is improved.

The two examples in FIGS. 2 and 3 and 4 and 5 can also be combined in particular with respect to the light source 7 and the partial region 11.

Figure 6:
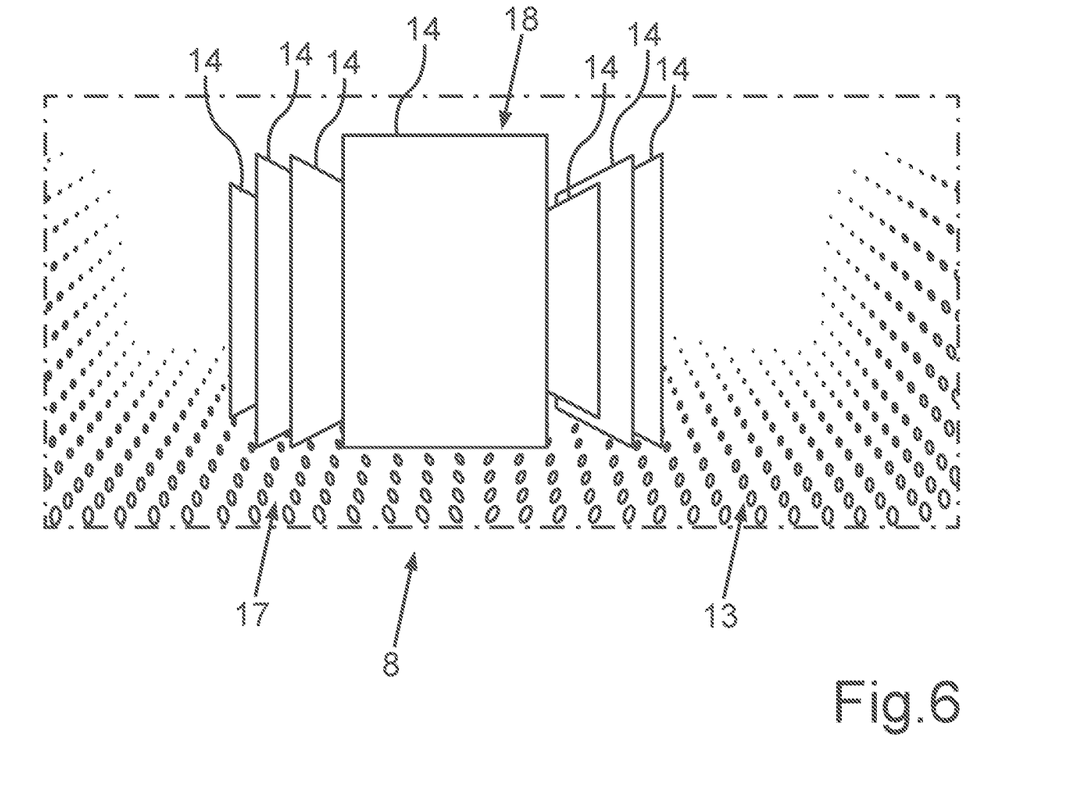
FIG. 6 is a schematic illustration of an image in an image plane with optical image information and a light pattern, as generated by a display apparatus.

FIG. 6 shows an exemplary illustration, which should not be understood to be exhaustive, of the image plane 10 with the visual image information 18 and the light pattern 13. In particular, the light pattern 13 is formed in the image plane 8 by the multiple reflection of the light beams 15 of the light source 7 and/or the partial region 11 at the two mirrors S1, S2. The light pattern 13 can be formed, for example, from light lines or light dots. With this light pattern 13, an optically infinite depth effect of the visual image information 18 is produced in particular for a viewer 16. The visual image information 18 is produced in particular by the electronic display 5 and projected by reflection at the first mirror S1 into the image plane 10. In this way, for example a holographic representation can be brought about for the viewer 16. The visual image information 18 can include in particular a plurality of image information elements 14. The image information elements 14 can represent for example different information or designs that can also be displayed and perceived in overlaid fashion.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A display apparatus for a motor vehicle, comprising:
at least one electronic display generating visual image information and having a first mirror and, arranged at a distance therefrom, a second mirror, the first and second mirrors at least partially overlapping in a projection view of both of the first and second mirrors, and forming an intermediate space in an overlap region between the first and second mirrors; and
at least one light source emitting light, into the intermediate space, reflectable multiple times at the first and second mirrors to generate an infinity mirror effect, resulting in generation of an image having a light pattern that appears with an optical depth effect, in an image plane of the display apparatus, the visual image information generated by the at least one electronic display being mirrored into the image plane via the first mirror so that the visual image information is represented in the image in addition to the light pattern, wherein the projected visual image information in the image plane appears as a holographic representation and the image comprises a holographic image comprising an overlay of the visual image information and the light pattern.

2. The display apparatus according to claim 1, wherein the at least one light source includes a component separate from the at least one electronic display.

3. The display apparatus according to claim 2, wherein the at least one light source is at least one of a light-emitting diode and a light-emitting diode strip.

4. The display apparatus according to claim 2, wherein the at least one light source is at least partially arranged in the intermediate space.

5. The display apparatus according to claim 1, wherein the at least one light source is formed by a partial region of the at least one electronic display, adjoining peripheral sides of the first and second mirrors and extending at least partially over an extent, measured between the first and second mirrors, of the intermediate space.

6. The display apparatus according to claim 5, wherein the partial region lies directly against the peripheral sides of both of the first and second mirrors and delimits the intermediate space.

7. The display apparatus according to claim 6,
wherein the at least one electronic display is formed from multiple display parts,
wherein a first display part of the at least one electronic display that is located upstream of the first mirror generates the visual image information, and
wherein a second display part, extending at least partially over the intermediate space, formed by the partial region and overlapping with the intermediate space as viewed in a direction perpendicular to the first and second mirrors, emits the light into the intermediate space.

8. The display apparatus according to claim 1, wherein the first mirror is at least partially semi-transparent.

9. The display apparatus according to claim 1, wherein an angle between the at least one electronic display and the first mirror is greater than 0° and smaller than 90°.

10. The display apparatus according to claim 9, wherein the angle is at least 45°.

11. A motor vehicle, comprising:
a chassis; and
a display apparatus, including
at least one electronic display generating visual information representable in a virtual image plane and having first and second mirrors separated by a distance, the first and second mirrors at least partially overlapping in a projection view of both of the first and second mirrors, and forming an intermediate space in an overlap region between the first and second mirrors; and
at least one light source emitting light, into the intermediate space, reflectable multiple times at the first and second mirrors to generate an infinity mirror effect, resulting in generation of an image having a light pattern that appears with an optical depth effect, in the virtual image plane of the display apparatus, the visual image information generated by the electronic display being mirrored into the virtual image plane via the first mirror so that the visual image information is represented in the image in addition to the light pattern, wherein the projected visual image information in the image plane appears as a holographic representation and the image comprises a holographic image comprising an overlay of the visual image information and the light pattern.

12. The motor vehicle according to claim 11, wherein the at least one light source includes a component separate from the at least one electronic display.

13. The motor vehicle according to claim 12, wherein the at least one light source is at least one of a light-emitting diode and a light-emitting diode strip.

14. The motor vehicle according to claim 12, wherein the at least one light source is at least partially arranged in the intermediate space.

15. The motor vehicle according to claim 11, wherein the at least one light source is formed by a partial region of the at least one electronic display, adjoining peripheral sides of the first and second mirrors and extending at least partially over an extent, measured between the first and second mirrors, of the intermediate space.

16. The motor vehicle according to claim 15, wherein the partial region lies directly against the peripheral sides of both of the first and second mirrors and delimits the intermediate space.

17. The motor vehicle according to claim 16,
wherein the at least one electronic display is formed from multiple display parts,
wherein a first display part of the at least one electronic display that is located upstream of the first mirror generates the visual image information, and
wherein a second display part, extending at least partially over the intermediate space, formed by the partial region and overlapping with the intermediate space as viewed in a direction perpendicular to the first and second mirrors, emits the light into the intermediate space.

18. The motor vehicle according to claim 11, wherein the first mirror is at least partially semi-transparent.

19. The motor vehicle according to claim 11, wherein an angle between the at least one electronic display and the first mirror is at least 45° and smaller than 90°.

20. A method for generating a virtual representation of visual information in a virtual image plane with a display apparatus, comprising:
reflecting image information from an electronic display of the display apparatus into the virtual image plane using a first mirror of the display apparatus;
emitting at least one light beam from a light source of the display apparatus into an intermediate space between the first mirror and a second mirror of the display apparatus, separated from the first mirror by a distance from the former; and
reflecting the light beam multiple times between the first and second mirrors in the intermediate space to generate an infinity mirror effect, so that an image with a light pattern having an optical depth effect is generated in the virtual image plane of the display apparatus, and the virtual representation of the image information and the light pattern are represented as visual information in the image in the virtual image plane, wherein the projected visual image information in the image plane appears as a holographic representation and the image comprises a holographic image comprising an overlay of the visual image information and the light pattern.

* * * * *